Patented Aug. 19, 1924.

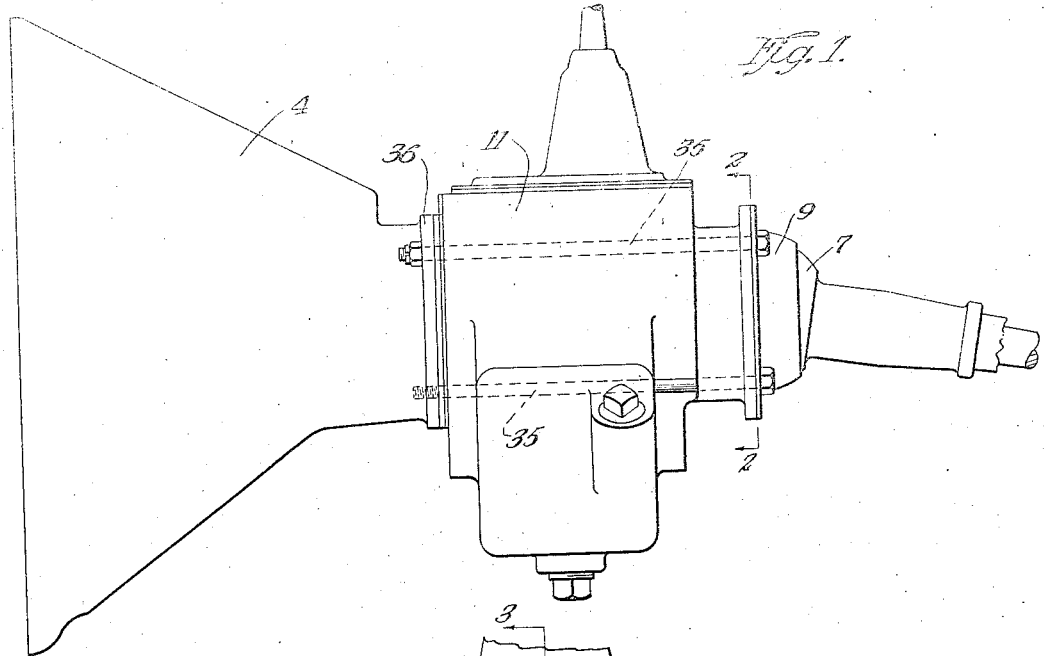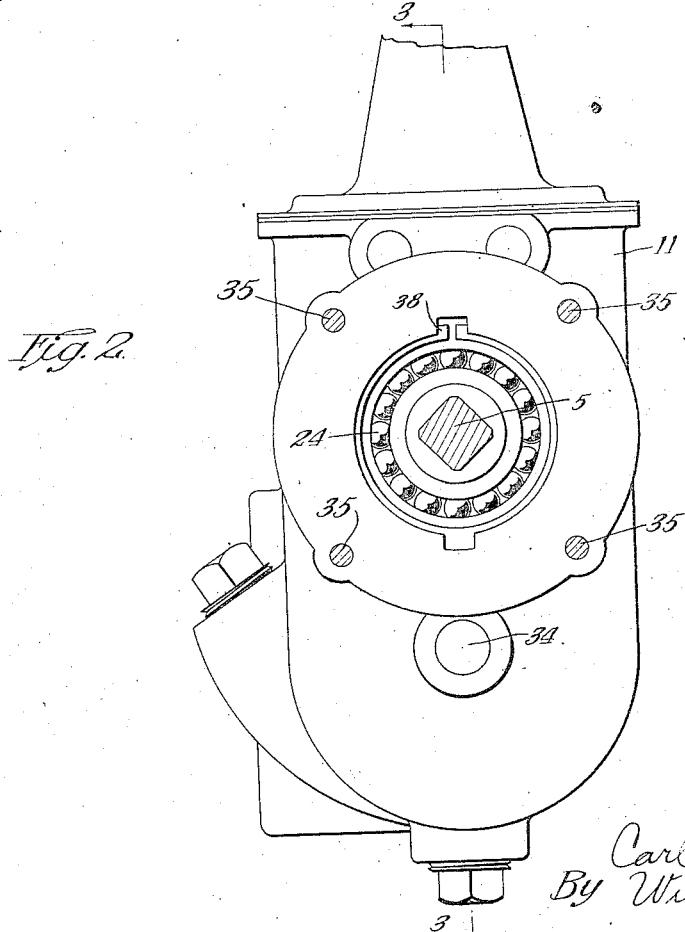

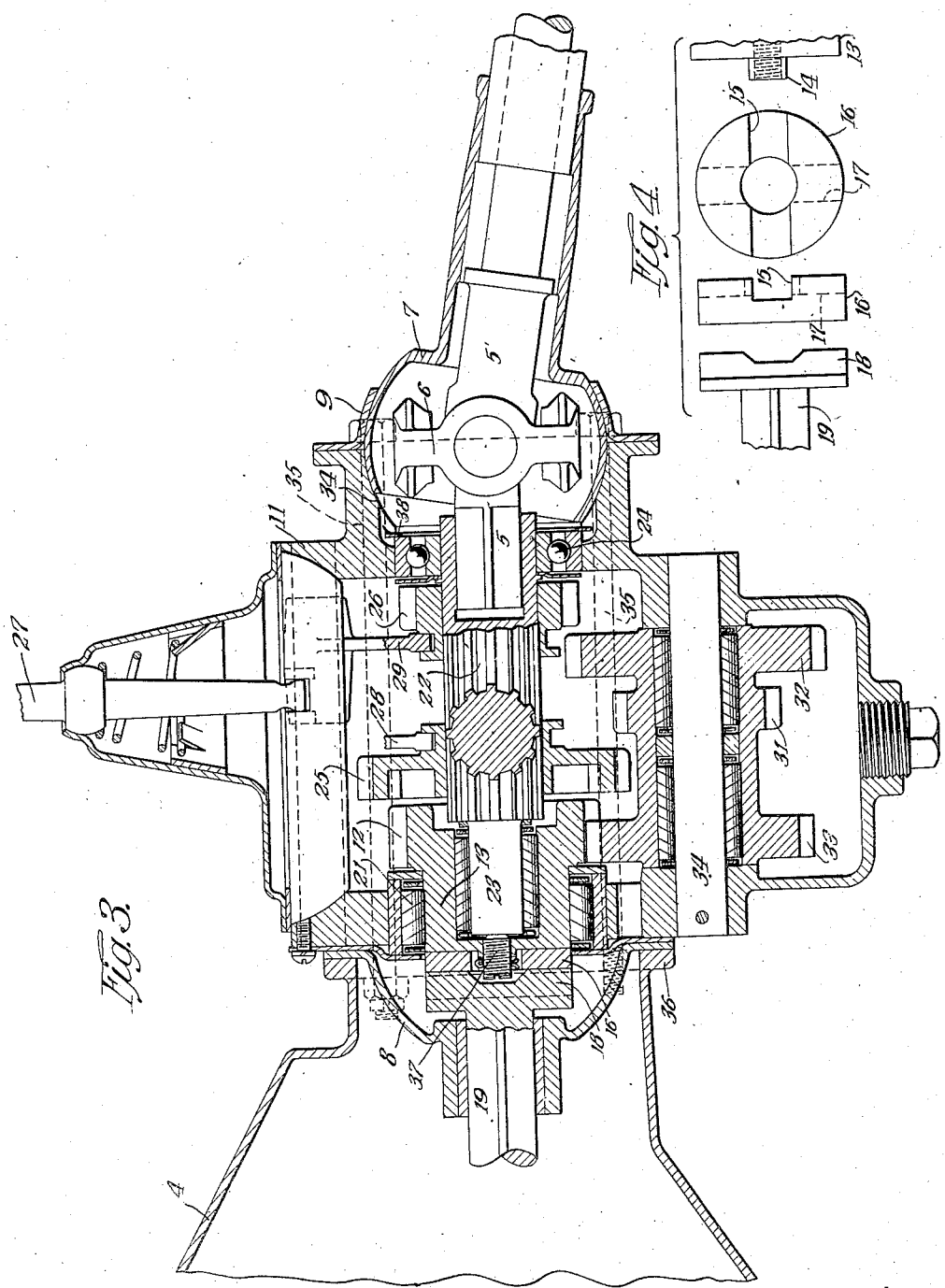

1,505,611

UNITED STATES PATENT OFFICE.

CARL E. SWENSON, OF ROCKFORD, ILLINOIS, ASSIGNOR TO MECHANICS MACHINE COMPANY, OF ROCKFORD, ILLINOIS, A CORPORATION OF ILLINOIS.

TRANSMISSION.

Application filed December 8, 1923. Serial No. 679,463.

*To all whom it may concern:*

Be it known that I, CARL E. SWENSON, a citizen of the United States, residing at Rockford, in the county of Winnebago and State of Illinois, have invented certain new and useful Improvements in Transmissions, of which the following is a specification.

This invention relates to change-speed transmission mechanism for motor vehicles, and more particularly, for Ford cars.

In view of the limited number of speed changes in Ford cars, due to its planetary type of transmission, it has become desirable, especially in the use of such cars as trucks and for commercial purposes, to equip them with a supplemental transmission including change-speed gears, this supplemental transmission being interposed between the casing of the planetary transmission and the universal joint which drives the propeller shaft. Such constructions have, however, been objectionable because of inherent structural characteristics. For example, in certain instances the supplemental transmission casing has been caused to weave, usually under a heavy pull, permitting certain of the gears to unmesh. If this occurs at a critical time it is invariably impossible to avert an accident. Furthermore, in such prior constructions the supplemental transmission unit has generally been of such over-all length that when attached to the regular transmission casing at one end only, considerable vibration is set up in the supplemental unit and propeller shaft, which is detrimental not only to the transmission mechanism and propelling train, but to the life of the entire vehicle.

The present invention aims primarily to obviate the objectionable features above mentioned by the provision of an improved supplemental transmission unit adapted to be mounted on a Ford car in a novel manner.

That is, my invention contemplates the provision of a change-speed gear transmission unit of considerably less over-all length than prior constructions, mounted on the casing of the vehicle transmission in such manner as to be very rigidly supported, and in fact, held under compression from end to end so as to prevent vibration and deflection. This is accomplished in the present instance by passing a plurality of longitudinal bolts or the equivalent, lengthwise through the supplemental transmission casing from end to end thereof in circumferentially spaced relation about the driving and driven shafts and change speed gears of said unit, and attaching said bolts or the equivalent, to the vehicle transmission casing, so that while the supplemental transmission casing is supported from one end only, it is nevertheless, held under considerable compression from end to end and practically all tension stresses are carried by said bolts instead of the casing. This prevents vibration and deflection and insures the desired rigidity of the supplemental unit.

Another object is to provide a driving connection between the driving shaft of the vehicle transmission and the supplemental transmission, such as will prevent weaving of the latter unit in the event of discrepancies and variations in the meeting faces in the mounting of said unit.

Still another object is to provide a generally improved supplemental transmission of the character described, which will be thoroughly practical and may be produced at a comparatively low cost.

Other objects and attendant advantages will be appreciated by those skilled in this art as the invention becomes better understood by reference to the following description when considered in connection with the accompanying drawings, in which—

Figure 1 is a side elevation of a change-speed transmission embodying my invention;

Fig. 2 is a cross-sectional view taken substantially on the line 2—2 of Fig. 1;

Fig. 3 is a vertical, longitudinal sectional view taken substantially on the line 3—3 of Fig. 2; and Fig. 4 is a plurality of views, grouped together, of the parts making up the self-aligning coupling which will be later described.

While my improvements were designed especially for use in connection with a Ford transmission, it should be understood that they are not limited to this particular use, but are of general application wherever they may be of utility. The present example is therefore, merely for purpose of illustration.

In the drawings, the reference numeral 4 indicates the casing which incloses the planetary transmission of a Ford car. The universal joint composed of the male and female joint members 5 and 5' respectively, and the joint coupling ring 6, together with the joint housing 7 and spherical housing seats 8 and 9, are standard Ford parts. My invention contemplates moving the universal joint back and interposing a change-speed gear transmission unit designated generally by 11, for the purpose of increasing the number of speed changes and greater power on the low speed, and for accomplishing the objects above mentioned.

To this end I have provided a transmission unit, the over-all length of which is reduced to a minimum, considering the number of change speeds obtained. It should be understood, however, that in the broader aspect of my invention, the particular number of speed changes and the construction and arrangement of the change speed parts, are not important. The particular construction herein disclosed presents nevertheless, a novel and desirable assembly, which will now be described.

Within the casing 11 of the supplemental transmission unit, I journal a driving gear 12, the hub 13 of which has formed integrally therewith on its forward end, a diametrical tongue 14 fitting in a complemental groove 15 of an intermediate driving part 16 having on its opposite face a diametrical groove 17 at right angles to the groove 15 for the reception of a tongue 18 integral with a driving member or shaft 19 connected to and driven by the planetary transmission (not shown) within the casing 4. The foregoing construction provides a self-aligning driving connection between the shaft 19 and the driving gear 12, whereby drive will be transmitted to the latter part without imposing any such deflecting strain on the supplemental unit as might be caused in the event that a rigid driving connection is employed between the shaft 19 and gear 12 or the equivalent, and in the further event that the supplemental transmission unit is not accurately aligned in its mounting on the casing 4. Consequently, with the present construction, there is no danger of the supplemental transmission unit weaving under such deflections, nor of the gears being unmeshed accidentally. It will be observed that this self-aligning coupling is set forwardly into the spherical housing seat 8 and that a relatively wide roller bearing 21 is provided in the casing 11 for the gear hub, thus locating the driving gear well forward and obtaining the desired coupling without disturbing the part 8.

The driven shaft 22 coaxial with the driving gear or member 12 has a pilot end 23 journaled in the hub 13 of said gear and is suitably journaled at its rear end through the agency of a ball bearing 24 in the casing 11. Gears 25 and 26 splined on the shaft 22 are adapted to be shifted by the usual control lever 27 and intermediate shifter forks 28 and 29 into and out of mesh with gears 31 and 32 respectively, the latter being counter-shaft gears continuously driven by a gear 33 in mesh with the driving gear 12. The countershaft gears are in the present instance integrally united and journaled by suitable roller bearings on a fixed supporting shaft 34 in turn supported by the casing 11. With the present gear ratios the gears 31 and 25 provide a low speed and the gears 32 and 26, a high speed, that is, higher than direct speed which is established by connecting the internal teeth of the gear 25 to the gear 12, as will be obvious. Thus, with a supplemental transmission of the character described, three speeds forward and reverse may be obtained, the reverse being through the reversing mechanism of the planetary transmission.

The rear end of the shaft 22 is shaped to receive the driving knuckle of the universal joint, said knuckle being squared in cross-section and fitting in said shaft so as to be driven thereby. The spherical part of the universal joint housing fits in a complemental spherical seat 34 in the casing 11, which together with the spherical housing seat 9, locates the universal joint in proper position.

In order to hold the supplemental transmission unit and its associated parts in the desired operative position on the casing 4, I employ a plurality; four in the present instance, of long bolts 35 or the equivalent spaced circumferentially about the change speed gears 25 and 26 and passing lengthwise through the full length of the casing 11 and attached to the flange 36 of the casing 4. It will be observed that the heads of these bolts clamp the universal joint spherical seat or retaining part 9 in position on the casing 11, and said casing together with the part 8 onto the casing 4. In this instance the uppermost bolts are equipped with nuts threaded onto their forward ends in front of the flange 36 for drawing up the bolts and putting the intermediate parts under compression, and that the lowermost bolts are threaded at their forward ends directly into the casing 4 and adapted to be tightened for the same purpose. Thus, a single set of bolts is utilized for connecting the supplemental transmission casing to the casing 4, and the driving members of both the regular and supplemental transmissions and the universal joint to the driven member of the supplemental transmission. It will be observed that these bolts put the supplemental transmission casing and associated parts under considerable compression and clamp said casing and parts rigidly to the casing 4 which itself is rigidly supported. It will be further observed that said bolts carry practically all tension loads and stresses and, being of steel, preferably of a medium carbon content and heat treated, have considerably greater tensile strength than the casing which is preferably, but not necessarily, of cast iron. It follows that with this rigid and stable mounting of the supplemental unit and with the casing thereof under compression, there is little or no cause for either vibration or deflection of this unit with respect to the casing 4. Inasmuch as the unit is wholly supported from one end, it will be manifest that the longer the unit casing and the farther the universal joint from its supported end, the greater will be the stresses at such supported end; but with my present invention this over-all dimension is reduced materially over prior constructions, and by clamping the supplemental unit casing to an equal degree from end to end against the rigid supporting part, said supplemental unit becomes practically an integral part with the casing 4. With the practical elimination of vibration and reduction of deflecting stresses to the minimum, there is less wear and strain on the connecting parts than if there were incessant friction and relative vibration between them as in those constructions in which the supplemental transmission unit, because of its inherent design, is subjected to weaving and also to more or less vibration with respect to the casing 4. Another advantage is that by reducing the over-all length of the supplemental transmission unit I reduce the stresses due to bending moment at its connection to the casing 4. This reduced over-all length also reduces the tension stresses, because of the shorter leverage resulting from torque thrust or pressure on the rear end of the supplemental casing. These varying and repetitive pressures (upward when propelling forward and downward when reverse) resulting in both compression and tension stresses are carried by the casing and through bolts, as will be manifest.

From the foregoing, it will be observed that the parts are very compactly arranged, with the driving parts of the supplemental transmission unit nested into the casing 4, and the universal joint nested in the casing of the supplemental unit, that this construction brings the universal joint relatively close to the casing 4, that by interposing the supplemental transmission in the driving train between the usual transmission and the propeller shaft, only a single set of fastening bolts is employed, and that the construction by reason of the self-aligning coupling, short overhang of the supplemental unit and support of its casing under compression gives a very stable and rigid unit in the propelling train. It should also be understood that in the latter aspect of the invention, the specific construction of the supplemental unit might be varied within a wide range, but that the organization of parts per se is beneficial and desirable and believed to be an advance in this art.

In order to hold the driven shaft 22 against axial displacement in opposite directions and in proper operative relation to its co-operating parts, I have an adjustable end thrust member 37 threadingly engaged in the forward end of the hub 13 and engaging the adjacent end of the shaft, and a split contractible retaining ring 38 removably seated in a groove in the casing 11 and holding the outer ball race of the bearing 24 and consequently this bearing and the shaft against rearward displacement. The parts 16 and 18 are recessed for the threaded part 37, and a cotter pin holds the latter part against turning.

It should be understood that in using the term " bolts " in the specification and claims applicant comprehends, and this term is intended to cover, any equivalent means for performing the same function.

It is believed that the foregoing conveys a clear understanding of the objects prefaced above, and while I have illustrated but a single working embodiment, it should be understood that considerable change might be made in details of construction without departing from the spirit and scope of the invention as expressed in the appended claims.

I claim:

1. In a motor vehicle, in combination, a primary transmission casing, a propeller shaft, a supplemental change speed transmission, a casing for said supplemental change speed transmission, said supplemental transmission and casing being interposed between the primary transmission casing and the propeller shaft, means attached to said primary casing and extending to the outer end of said supplemental casing for connecting the supplemental casing to the primary casing and putting the supplemental casing under compression, said means being adapted to carry substantially all tension stresses.

2. In a motor vehicle, in combination, a primary transmission casing, a propeller shaft, a supplemental change-speed transmission, a casing for said supplemental transmission, said supplemental transmission and casing being interposed between the primary casing and the propeller shaft, bolts connecting said supplemental casing to said primary casing, said bolts extending substantially from end to end of said supplemental casing and adapted to put said supplemental casing under compression when in their operative position, said bolts carrying substantially all tension stresses.

3. In a motor vehicle, the combination with a primary transmission casing, a propeller shaft, a supplemental change speed transmission casing interposed between said primary transmission casing and said shaft, spaced circumferentially positioned bolts connecting said primary casing and said supplemental casing, said bolts extending substantially through said supplemental casing for putting said supplemental casing under compression, said bolts carrying substantially all tension stresses.

4. In a motor vehicle, in combination, a primary transmission casing, a propeller shaft, a supplemental change-speed transmission, a casing for said supplemental transmission, bolts for attaching said supplemental transmission casing to said primary transmission casing, said bolts extending lengthwise through said supplemental transmission casing and putting it under compression substantially from end to end, and means connecting the propeller shaft to the supplemental transmission and its casing whereby the latter is subjected to torque reaction thrusts and whereby said through bolts carry substantially all of the tension stresses resulting therefrom.

CARL E. SWENSON.